United States Patent [19]

Shur et al.

[11] 3,772,062

[45] Nov. 13, 1973

[54] ULTRA-VIOLET CURABLE COATING COMPOSITIONS

[75] Inventors: Eliakum Gustave Shur, Union; Robert Dabal, Wallington, both of N.J.

[73] Assignee: Inmont Corporation, New York, N.Y.

[22] Filed: Nov. 16, 1971

[21] Appl. No.: 199,374

[52] U.S. Cl. ... 117/93.31, 117/161 C, 117/161 UT, 117/161 UC, 117/161 ZB, 260/47 UA, 260/837 R
[51] Int. Cl. ......... B44d 1/50, C08f 1/20, C08f 3/62
[58] Field of Search .................... 117/93.31, 161 C, 117/161 UT, 161 UC, 161 ZB; 260/80.76, 80.81, 86.1 R, 86.1 E, 47 UA, 837 R

[56] References Cited
UNITED STATES PATENTS

| | | | |
|---|---|---|---|
| 3,597,373 | 8/1971 | Bregoff et al. | 117/161 UC |
| 3,631,127 | 12/1971 | Nomura et al. | 117/161 UT |

Primary Examiner—William D. Martin
Assistant Examiner—John H. Newsome
Attorney—F. W. Wyman et al.

[57] ABSTRACT

Novel ultra-violet curable coating compositions preferably comprising the diacrylate of an epichlorohydrin-bisphenol-A epoxy resin, neopentyl glycol diacrylate, hydroxyethyl acrylate, dicyclopentenyl acrylate and a photosensitizer. These coating compositions cure rapidly under ultra-violet light, even in the presence of oxygen, and result in hard, stain-, fade-, abrasion-, and weather-resistant coatings.

12 Claims, No Drawings

ULTRA-VIOLET CURABLE COATING COMPOSITIONS

BACKGROUND OF THE INVENTION

1. Field of the Invention

This application relates to novel acrylic coating compositions which are curable by exposure to ultra-violet or other actinic radiation.

2. Description of the Prior Art

It is old and well known in the art to deposit polymerizable liquid coatings on substrates such as fiber-board and to cure such coatings by passing the wet coated fiberboard through ovens to cross-link the coatings and form hard dry coatings which are resistant to stains, weather, abrasion and fading. It has also recently become known in the art to use coatings which are curable by exposure to actinic radiation such as ultraviolet or that from plasma arc radiation sources; as well as by exposure to high energy ionizing radiation such as electron beam radiation.

Heat curing systems have the disadvantage that large investment in heating ovens is necessary. Also, the cost of providing the necessary heat in terms of utilities such as natural gas, etc., is relatively large, the curing time is relatively long, and relatively large amounts of plant floor space are required for the ovens. Furthermore, many, if not most, conventional heat-curing systems use volatile solvents which are driven off upon curing. Such solvents contribute substantially to atmospheric pollution.

Known ultra-violet systems are an improvement on heat-cured systems, but they too have disadvantages. Among these are the fact that oxygen from ambient air tends to inhibit cross-linking of the coating. Such oxygen inhibition problems have been attacked in two ways. Nitrogen or other inert gas blankets have been used in the area of application of the ultra-violet radiation. Use of such blankets is obviously expensive and awkward. In Europe an alternative approach has been used wherein paraffin or other suitable waxes are incorporated in the liquid coatings and allowed to rise to the surface to form a liquid wax film on top of the U. V. curable liquid coating so that a wax blanket is effectively provided. This system, too, is awkward to use and requires a post-curing wax removal step to remove the wax coating from the cured plastic surface. The disadvantages of such a process are obvious and thus this process has never been widely accepted in the United States.

Other problems which have been experienced with earlier U. V. curing coatings are lack of good physical properties, such as stain resistance, and lack of sufficient speed in curing.

SUMMARY OF THE INVENTION

Applicants have developed certain novel coating compositions for use with ultra-violet light curing techniques. Broadly, the preferred compositions comprise the diacrylate of an epichlorohydrin-bisphenol-A epoxy resin, neopentyl glycol diacrylate, hydroxyethyl acrylate, dicyclopentenyl acrylate and a photosensitizer. The compositions may also include conventional additives to modify gloss and other physical properties.

Applicants' novel compositions result in superior cure rates, thus allowing increased process speeds on coating lines. The U. V. equipment required is easily adaptable to conventional coating lines, requires relatively little floor space and is relatively economical to purchase and operate. Use of these compositions also results in coatings which have superior physical properties such as stain resistance, abrasion resistance, fade resistance and weather resistance. The novel compositions of this invention are curable at rapid rates without the necessity for either inert gas or wax blanketing, i.e. these novel compositions are not oxygen inhibited. The novel compositions of this invention can be used on a wide variety of substrates such as hardboard, plywood, primed metals, masonry, etc. They have particular advantage on temperature-sensitive substrates. They are relatively non-volatile and exhibit little or no shrinkage on curing. Furthermore, they are nearly 100 percent reactive and thus exude little or no atmospheric pollutants upon curing.

The broad compositions within the scope of this invention are set forth below. All parts are by weight.

From about 16 – 60 percent the diacrylate of an epichlorohydrin-bisphenol-A epoxy resin
about 10 – 42 percent neopentyl glycol diacrylate
about 0 – 21 percent hydroxyethyl acrylate
about 5 – 15 percent dicyclopentenyl acrylate
about 2 – 7 percent photosensitizer Preferred compositions within the scope of this invention contain from about:

40 to about 60 percent the diacrylate of an epichlorohydrin-bisphenol-A epoxy resin
15 to about 25 percent neopentyl glycol diacrylate
10 to about 20 percent hydroxyethyl acrylate
5 to about 15 percent dicyclopentenyl acrylate and
2 to about 5 percent photosensitizer.

DESCRIPTION OF THE PREFERRED EMBODIMENTS

The diacrylate of an epichlorohydrin-bisphenol-A epoxy resin which is used has a very rapid curing speed and increase of its percentage in the overall composition will generally accelerate cure.

Neopentyl glycol diacrylate in the compositions of this invention functions to increase cross-linking and increase of its relative proportion in the composition generally results in harder, more chemically resistant coatings. Applicants have found that pentaerythritol tetraacrylate can be substituted for neopentyl glycol diacrylate, but the latter is preferred since its use results in better package stability, i.e. storage stability prior to application.

Hydroxyethyl acrylate contributes the properties of hydrophilicity to the overall composition, and thus its increase will result in increased susceptibility to water. For some applications, such as wallboard coatings or other cellulosic substrates the hydroxyethyl acrylate can be omitted entirely. Such omission modifies the liquid coating by reducing hydroxy functionality and changes the properties of the resultant cured coating by altering its wetting characteristics.

Dicyclopentenyl acrylate contributes the properties of low volatility and rapid curing and its use results in a hard, tough cured film. Phenyl glycidyl ether acrylate can also be used, but dicyclopentenyl acrylate is preferred.

The properties resulting from the combination of Epon diacrylate and dicyclopentenyl acrylate are believed to be particularly important to this invention.

The compositions of this invention also contain an ultra-violet light sensitizer. Sensitizers which are useful have been found to be those which have a triplet energy in the range between about 42 and 85 kcal/mole. Many materials which are within this range are disclosed in Table 5 – 13 on page 132 of Molecular Photochemistry by N. J. Turro (W. A. Benjamin, Inc. 1967), which is incorporated herein by reference. Preferred sensitizers have been found to be acetophenone, benzophenone, xanthone, Michler's ketone and mixtures thereof. Also, the addition of methyl diethanolamine to these sensitizers has been found to be particularly useful. As an example of use of methyl diethanolamine, 3 parts of it per each two parts benzophenone have been found to be useful. The sensitizers of this invention are normally added to the composition in one of two ways. Either the sensitizer is melted, poured into and mixed with the composition or the composition and powdered sensitizer are ground together on a conventional three-roll mill.

Hydroxyethyl acrylate, dicyclopentenyl acrylate and neopentenyl glycol diacrylate are known compounds, the latter two being disclosed in French patent No. 2,046,111.

An example of the diacrylate of an epichlorohydrin bisphenol-A epoxy resin is the diacrylate of Epon 826 resin, a Shell Chemical Company product. Upon 826 is an epichlorohydrin/bisphenol A-Type epoxy resin which is more particularly described in Shell's "Data Sheet — Epon Resin 826" (July 1962). The diacrylate of this resin can be formed by reacting stoichiometric amounts of acrylic acid and Epon 826 resin and about 0.5 percent by weight pyridine with air sparge agitation. Heat is gradually provided until 140°F is reached. That temperature is then maintained for 10 hours. The temperature is then raised to 160°F and maintained there until the following properties are obtained:

acid number: 0 – 1 mg. KOH/gm. sample
viscosity (250°C): 5,000 poises (Laray)
color: 1 (Gardner)

Continue air sparge while cooling.

Phenyl glycidyl ether acrylate can be made from commercially available phenyl glycidyl ether and acrylic acid in substantially the same manner by reacting until the following properties are obtained:

acid value: 0.005 equi./100 gm
epoxide value: 0.019 equiv./100 gm
color: 6 – 8 (Gardner)
viscosity: 140 – 180 cps (Brookfield) (25°C)

It will be obvious to those skilled in the art that other epichlorohydrin/bisphenol A-Type epoxy resins can be substituted for Epon 826. An example is Dow's DER-332 epoxy resin.

The following examples and tables illustrate the preparation, curing, relative curing rates and physical properties of the novel compositions of this invention.

EXAMPLE 1

A coating composition was prepared from the following amounts of components:

| | |
|---|---|
| 50.0 parts | Epon diacrylate |
| 20.0 parts | neopentyl glycol diacrylate |
| 20.0 parts | hydroxyethyl acrylate |
| 10.0 parts | dicyclopentenyl acrylate |
| 5.0 parts | photosensitizer |
| 105.0 | Total |

The photosensitizer used was a mixture of 2 parts benzophenone and 3 parts methyldiethanolamine.

The composition was prepared by mixing the components in the following manner: The Epon diacrylate polymer is added to the monomers and mixed in conventional equipment at low to medium speeds until dissolved. Then the photosensitizer is added.

EXAMPLE 2

The coating of Example 1 was applied to a cellulosic substrate (hardboard) by direct roller coating. The wet coated substrate was then exposed to U. V. radiation by being placed on a chain link conveyor and passed under a 200 watt/lineal inch Hanovia quartz ultraviolet lamp at a distance of about two inches.

The coatings in all of the following tables were prepared, applied and cured in substantially the same manner described in Examples 1 and 2.

Table I shows the compositions and cure rates of similar compositions, one employing Epon diacrylate and the other employing another U. V. —curing composition. The curing speed of the composition of this invention (Composition B) was twice as fast as that of Composition A. Other than alternative use of the first two materials, Compositions A and B were identical.

TABLE I

| Components | Composition A | B |
|---|---|---|
| NPO 80/20 (1) | 62.5 | |
| CULR 266 (2) | | 50.0 |
| NPGDA (3) | 20.0 | 20.0 |
| HEA (4) | 7.5 | 20.0 |
| DCPA (5) | 10.0 | 10.0 |
| Q-2 Photosensitizer (6) | 5.0 | 5.0 |
| Total | 105.0 | 105.0 |
| Cure Speed, 200 watt/inch Hanovia U. V. lamp | 2 passes at 24 f.p.m. | 1 pass at 24 f.p.m. |

(1) 80% solution of Union Carbide PCP-0300 polycaprolactone/toluene diisocyanate oligomer in 20% Hydroxyethyl Acrylate.
(2) Epon Diacrylate.
(3) Neopentyl Glycol Diacrylate.
(4) Hydroxyethyl Acrylate.
(5) Dicyclopentenyl Acrylate.
(6) 2 parts of Benzophenone/3 parts of Methyldiethanolamine.

Table II below is a comparison of the curing rates of various compositions of this invention. As shown by compositions A and B, the coatings of this invention are compatible with other known U. V. curable materials and can sometimes even yield improved curing speeds when blended therewith.

TABLE II

| | A | B | C | D | E |
|---|---|---|---|---|---|
| NPO 80/20 | 36.2 | | | | |
| EPOA (1) | 4.8 | 4.5 | | | |
| CULR 266 | 16.2 | 57.0 | 54.5 | 59.5 | 47.6 |
| NPGDA | 14.2 | 18.1 | 17.3 | 19.0 | 19.0 |
| DCPA | 14.2 | 9.0 | 8.7 | 9.5 | 9.5 |
| HEA | 9.6 | 6.9 | 15.2 | 7.2 | 19.0 |
| Q-2 | 4.8 | 4.5 | 4.3 | 4.8 | 4.9 |
| Total | 100.0 | 100.0 | 100.0 | 100.0 | 100.0 |
| Cure rate 200 watt/in. lamp | 1 pass at 20 f.p.m. | 1 pass at 24 f.p.m. | 1 pass at 24 f.p.m. | 1 pass at 24 f.p.m. | 1 pass at 30 f.p.m. |

(1) EPOA is a polyacrylate of epoxidized soya bean oil available from Union Carbide Corporation.

Table III below further illustrates the varied compositions and cure rates of this invention and also compares 60° gloss values for the various cured coatings.

60° gloss was measured by a Photovolt Gloss Meter using conventional techniques.

TABLE III

| | A | B | C | D | E | F | G |
|---|---|---|---|---|---|---|---|
| CULR 266 | 32.3 | 46.2 | 45.0 | 41.4 | 38.1 | 51.9 | 42.0 |
| NPGDA | 42.0 | 18.6 | 18.1 | 22.2 | 26.0 | 10.4 | 16.8 |
| HEA | 12.9 | 18.6 | 18.1 | 16.6 | 15.2 | 20.7 | 16.7 |
| DCPA | 6.4 | 9.2 | 9.0 | 8.3 | 7.6 | 10.4 | 8.5 |
| Q-2 | 3.2 | 4.6 | 4.4 | 4.1 | 3.9 | 6.6 | 5.5 |
| Syloid 161 [1] | 3.2 | | | 2.4 | 4.6 | | 10.5 |
| Zeothix 95 [2] | | 2.8 | 5.4 | 5.0 | 4.6 | | |
| Total | 100.0 | 100.0 | 100.0 | 100.0 | 100.0 | 100.0 | 100.0 |
| Cure rate, 200 watt/in. lamp | [3] | [4] | [4] | [5] | [5] | [6] | [6] |
| Gloss 60° | 77 | 84 | 80 | 47 | 38 | 96 | 35 |

[1] Syloid 161 is a surface treated pyrogenic silica produced by W.R. Grace Corporation.
[2] Zeothix 95 is a specially processed silica made by J.M. Huber Corporation.
[3] 3 passes at 24 f.p.m.
[4] 1 pass at 20 f.p.m.
[5] 2 passes at 20 f.p.m.
[6] 1 pass at 30 f.p.m.

Table IV below compares the physical properties of a cured coating made from a composition of this invention (Composition A) with such a coating made from Composition B, which is a commercially available clear, solvent-based, acid-catalyzed alkyd-amino composition. Composition B was cured by heating in an oven for 8 minutes at 200°F. Both compositions were applied in the same manner to hardboard, in dry film thicknesses of about 0.75 mil.

TABLE IV

COMPOSITION A

| | |
|---|---|
| CULR 266 | 43.6 |
| NPGDA | 17.5 |
| HEA | 17.5 |
| DCPA | 8.7 |
| 211-76-A (20% CAB(1) 80% NPGDA) | 7.0 |
| Q-2 | 5.7 |

(1) CAB is cellulose acetate butyrate

Physical Testing Results

A. Stain Test

| | B | A |
|---|---|---|
| 1. Alcohol | None | None |
| 2. 3% NaOH | None | None |
| 3. Oleic Acid | None | None |
| 4. Ammonia | None | None |
| 5. *Clorox | None | None |
| 6. Blueing | None | None |
| 7. 3% Hcl | Etched & Blistered | None |
| 8. Vinegar | Slight ring | None |
| 9. 3% H₂O₂ | None | None |
| 10. Turpentine | Definite ring | Slight ring |
| 11. Gasoline | None | None |

24 hours under watch glass.

B. Taber Abrasion

| | | |
|---|---|---|
| Weight Loss (CS10 Wheel, 1000 grams, 1000 cycles) | 32 mg | 22 mg |

C. Fadeometer No differences were noticed after 24 hours.
D. Weatherometer After 24 hours exposure only difference noted was swelling of hardboard along unprotected edges which were exposed to water.
* Trade Mark Tests A, B, C and D in Table IV were carried out as set forth below:

A. Stain tests are run by placing the reagents on the horizontal coated surface and covering with a watch glass. The reagents are removed after 24 hours with hand soap and water and the coat examined.

B. Taber Abrasion is run using a CS-10 wheel and a 1,000 gram weight on the wheel. Panels are weighed before and after 1,000 cycles and the weight loss reported in milligrams.

C. An Atlas Fade-Ometer Model 18-WT is used for the specifications.

D. An Atlas Twin-Arc Weather-Ometer, Model DMC is used with a 102–18 cam. The cycle consists of continuous carbon arc light with frontal spray of water for 18 minutes of every 2-hour period.

Specific conditions have been set forth above for curing the compositions of this invention by exposure to ultraviolet light. However, it should be understood that these conditions are merely exemplary and not limiting. For example, it will be obvious to those skilled in the art that the power of the light source, the distance from the source to the material being cured and the speed of movement beneath the light source of the material being cured are all-variables. The adjustment of the variables to achieve an effective amount of ultraviolet light is well within the capabilities of one ordinarily skilled in the art.

It may sometimes be desirable to add a flowout improver to the compositions of this invention to increase the uniformity and/or speed of flowout of the compositions, and to improve wetting and prevent cratering. Such flowout improvers are particularly useful when the coating composition is to be applied by direct or reverse roller coater or by a precision gravure coater. An effective flowout improver has been found to be a high-butyrate-content cellulose acetate butyrate such as Eastman Kodak's 551-0.2, which is about 55 percent by weight butyrate. The determination of an effective amount of this flowout improver for the various compositions within the scope of this invention will be obvious to those skilled in the art. However, the following composition is exemplary:

| | |
|---|---|
| CULR 266 | 40% by weight |
| NPGDA | 16 |
| DCPA | 16 |
| 211-53-B(1) | 16 |
| HEA | 8 |
| Q-2 | 4 |
| Total | 100% |

(1) 5% by weight Eastman Kodak's 551-0.2 cellulose acetate butyrate in 95% NPGDA.

Although this application is primarily directed to use of ultraviolet radiation as the preferred method to cure the subject compositions, it will be obvious to those skilled in the art that other forms of actinic radiation can also be employed. Examples of such other forms are electron beam irradiation and plasma-arc irradiation.

We claim:

1. A liquid coating composition curable by actinic radiation comprising a blend of
   a. the diacrylate of an epichlorohydrinbisphenol A epoxy resin
   b. neopentyl glycol diacrylate or pentaerythritol tetraacrylate
   c. hydroxyethyl acrylate
   d. dicyclopentenyl acrylate or phenyl glycidyl ether acrylate with an effective amount of a photosensitizer.

2. The composition of claim 1 wherein the photosensitizer has a triplet energy in the range between about 42 and 85 kcal per mole.

3. The composition of claim 2 wherein (a) has an acid number of 0 – 1 mg KOH/gm, a viscosity of about 5,000 poises (Luray) and a Gardner color of about 1, (b) is neopentyl glycol diacrylate and (d) is dicyclopentenyl acrylate.

4. The composition of claim 3 wherein the photosensitizer is selected from the group consisting of acetophenone, benzophenone, xanthone, Michler's ketone and mixtures thereof.

5. The composition of claim 4 wherein the photosensitizer additionally contains methyl diethanolamine.

6. The composition of claim 5 wherein the photosensitizer is benzophenone.

7. The composition of claim 6 wherein the components are present in the following weight percent ranges:
   16 – 60% epichlorohydrin-bisphenol-A epoxy resin diacrylate
   10 – 42% neopentyl glycol diacrylate
   0 – 21% hydroxyethyl acrylate
   5 – 15% dicyclopentenyl acrylate
   2 – 7 % photosensitizer.

8. The composition of claim 6 wherein the components are present in the following weight percent ranges:
   40 – 60% epichlorohydrin-bisphenol-A epoxy resin diacrylate
   15 – 25% neopentyl glycol diacrylate
   10 – 20% hydroxyethyl acrylate
   5 – 15% dicyclopentenyl acrylate
   2 – 5 % photosensitizer.

9. The composition of claim 8 wherein the photosensitizer is a mixture of 2 parts benzophenone to 3 parts methyl diethanolamine.

10. The composition of claim 9 wherein the composition additionally contains a high butyrate content cellulose acetate butyrate.

11. The method of providing a stain-, weather-, abrasion- and fade-resistant plastic coating on a substrate comprising coating the substrate with the composition of claim 1 and then exposing the coated substrate to an effective amount of actinic radiation.

12. A substrate carrying a plastic coating comprising the cured composition of claim 1.

* * * * *